(12) United States Patent
Huang

(10) Patent No.: US 8,966,808 B2
(45) Date of Patent: Mar. 3, 2015

(54) QUICK RELEASE FLY REEL ADAPTER

(76) Inventor: Rex H. Huang, Sandy, UT (US)

( * ) Notice: Subject to any disclaimer, the term of this patent is extended or adjusted under 35 U.S.C. 154(b) by 111 days.

(21) Appl. No.: 13/490,741

(22) Filed: Jun. 7, 2012

(65) Prior Publication Data

US 2012/0311915 A1  Dec. 13, 2012

Related U.S. Application Data

(60) Provisional application No. 61/494,746, filed on Jun. 8, 2011.

(51) Int. Cl.
  *A01K 87/06* (2006.01)
  *A01K 87/00* (2006.01)
  *A01K 97/10* (2006.01)

(52) U.S. Cl.
  CPC ..................... *A01K 87/06* (2013.01)
  USPC ................................ 43/22; 43/21.2

(58) Field of Classification Search
  USPC .......... 43/22, 25, 20, 21.2; 224/922; 242/316, 242/310, 323, 311
  See application file for complete search history.

(56) References Cited

U.S. PATENT DOCUMENTS

| | | | | |
|---|---|---|---|---|
| 82,377 A * | 9/1868 | Bradley | .................. | 242/310 |
| 1,038,203 A * | 9/1912 | Ricketts | .................. | 43/21 |
| 1,154,123 A * | 9/1915 | Manning | .................. | 43/22 |
| 2,753,646 A * | 7/1956 | Colmery | .................. | 43/22 |
| 3,053,004 A * | 9/1962 | Baker | .................. | 43/25 |
| 7,086,195 B2 | 8/2006 | Borgeat | | |
| 7,089,699 B2 * | 8/2006 | Borgeat | .................. | 43/18.1 CT |
| 7,114,282 B2 * | 10/2006 | Nakagawa | .................. | 43/22 |
| 7,621,066 B1 * | 11/2009 | Mathison | .................. | 43/21.2 |
| 2007/0246589 A1 * | 10/2007 | Martin et al. | .................. | 242/310 |
| 2008/0308663 A1 * | 12/2008 | Hiraoka et al. | .................. | 242/233 |
| 2009/0032631 A1 * | 2/2009 | Koelewyn | .................. | 242/257 |
| 2011/0239518 A1 * | 10/2011 | Zuckerman | .................. | 43/22 |

* cited by examiner

*Primary Examiner* — Darren W Ark
*Assistant Examiner* — Morgan T Barlow
(74) *Attorney, Agent, or Firm* — Morriss O'Bryant Compagni, PC

(57) ABSTRACT

An apparatus for coupling a fishing rod to a reel comprises a rod mount for attachment to a reel seat of a fishing pole and a first body defining a first attachment portion. A reel mount includes a rod seat for attachment to a fishing reel and a second body having a second attachment portion configured to be selectively and releasably attached to the first attachment portion of the first body. A support arm includes a retaining portion configured to be selectively and releasably attached to the reel mount. A latch is coupled to the reel mount to secure the reel mount to the rod mount and is configured for being movable from a first position where the rod mount is secured to the reel mount to a second position where the rod mount can be separated from the reel mount.

20 Claims, 16 Drawing Sheets

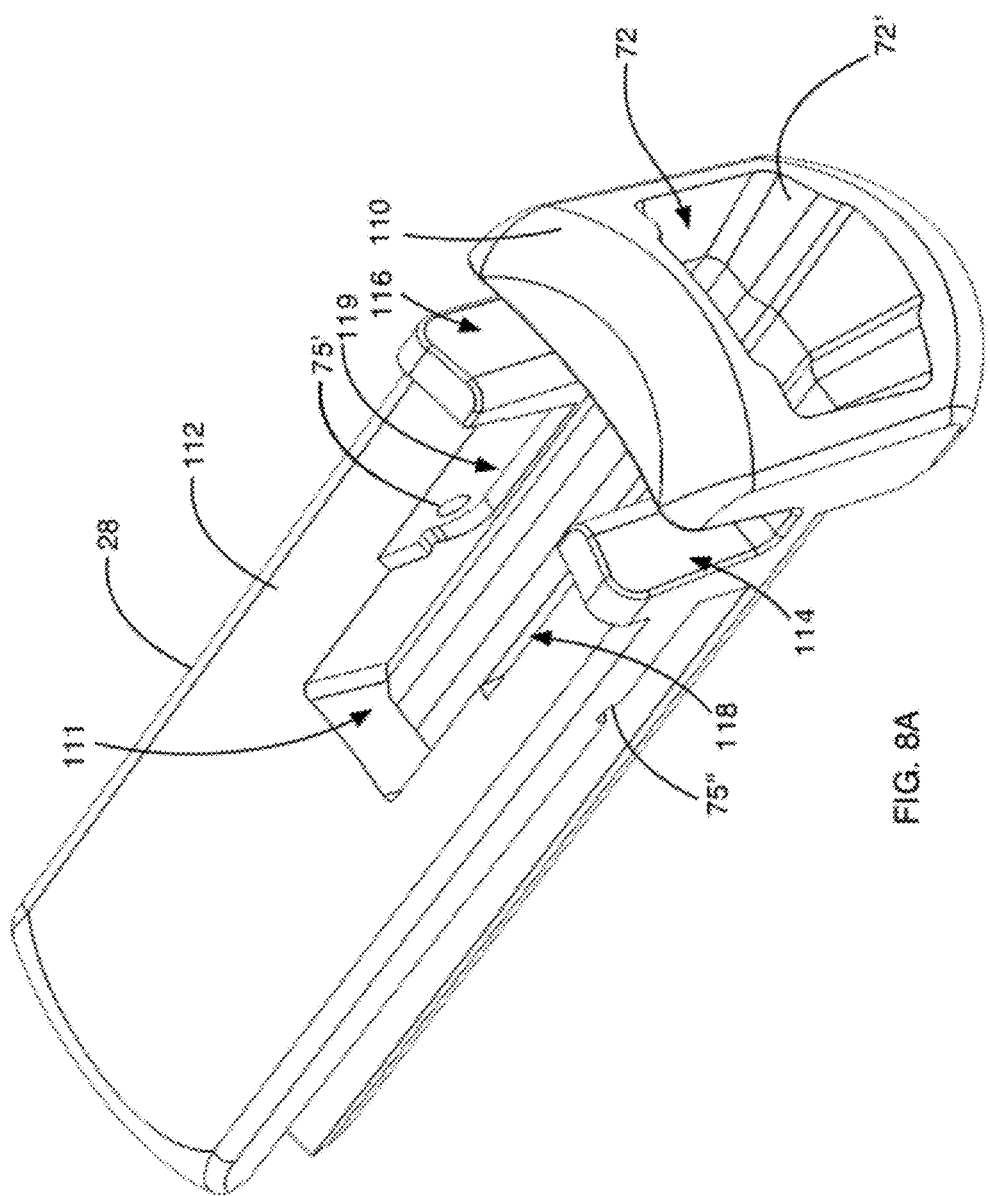

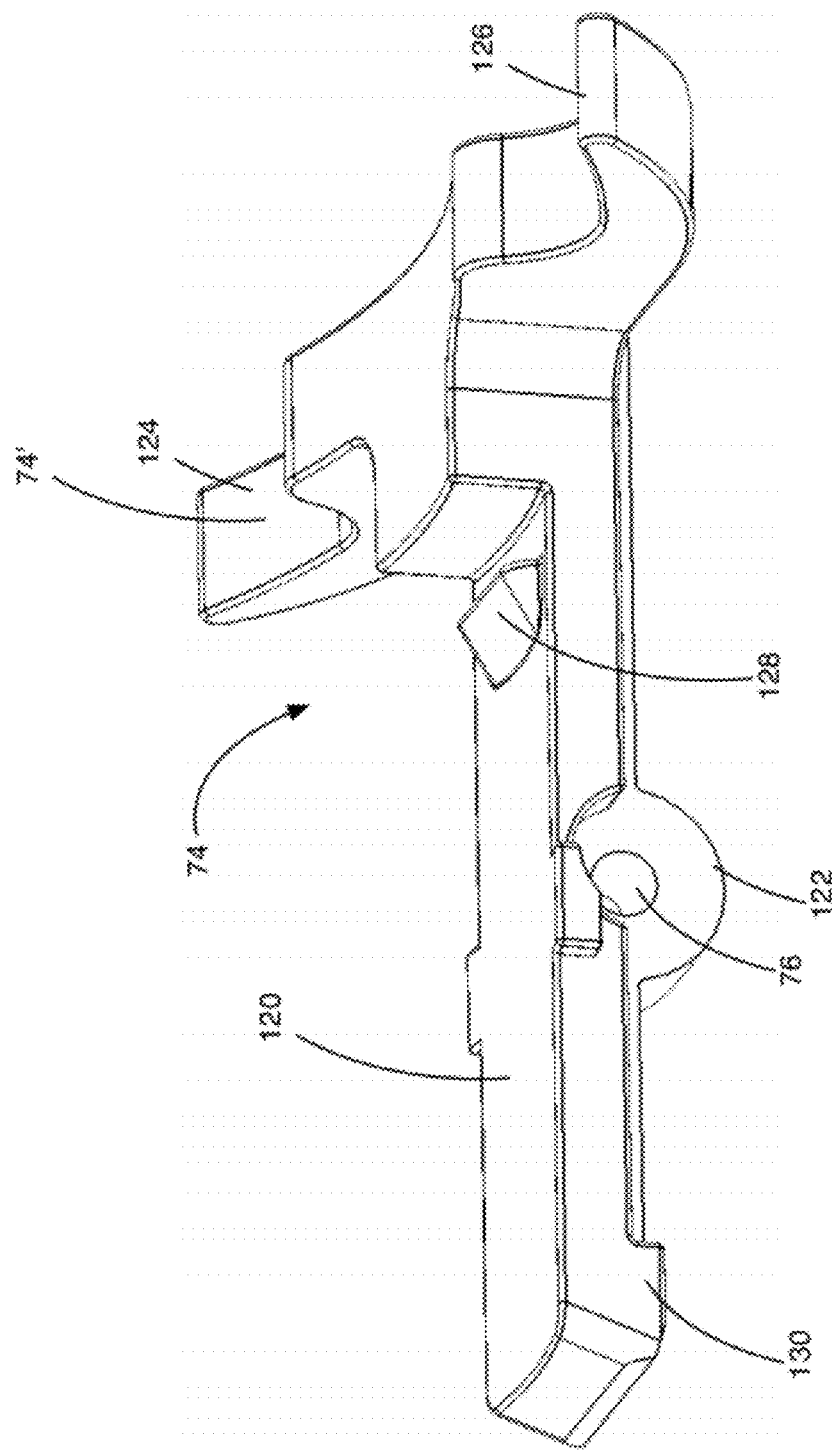

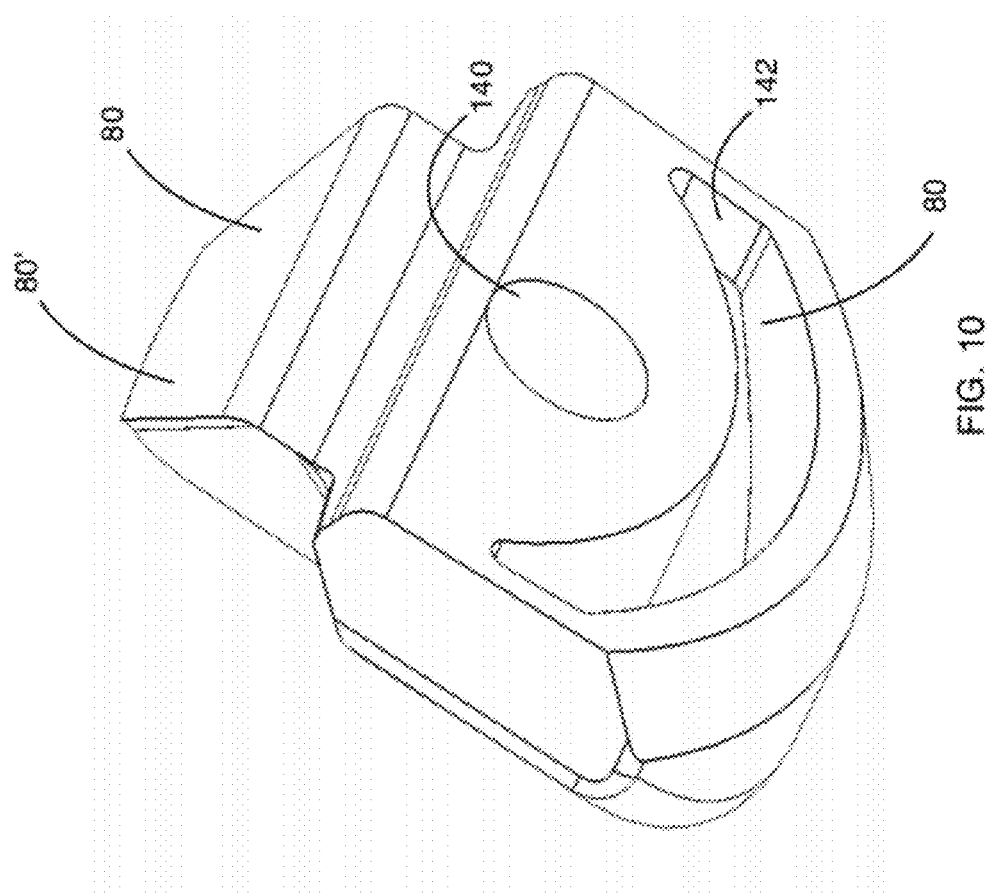

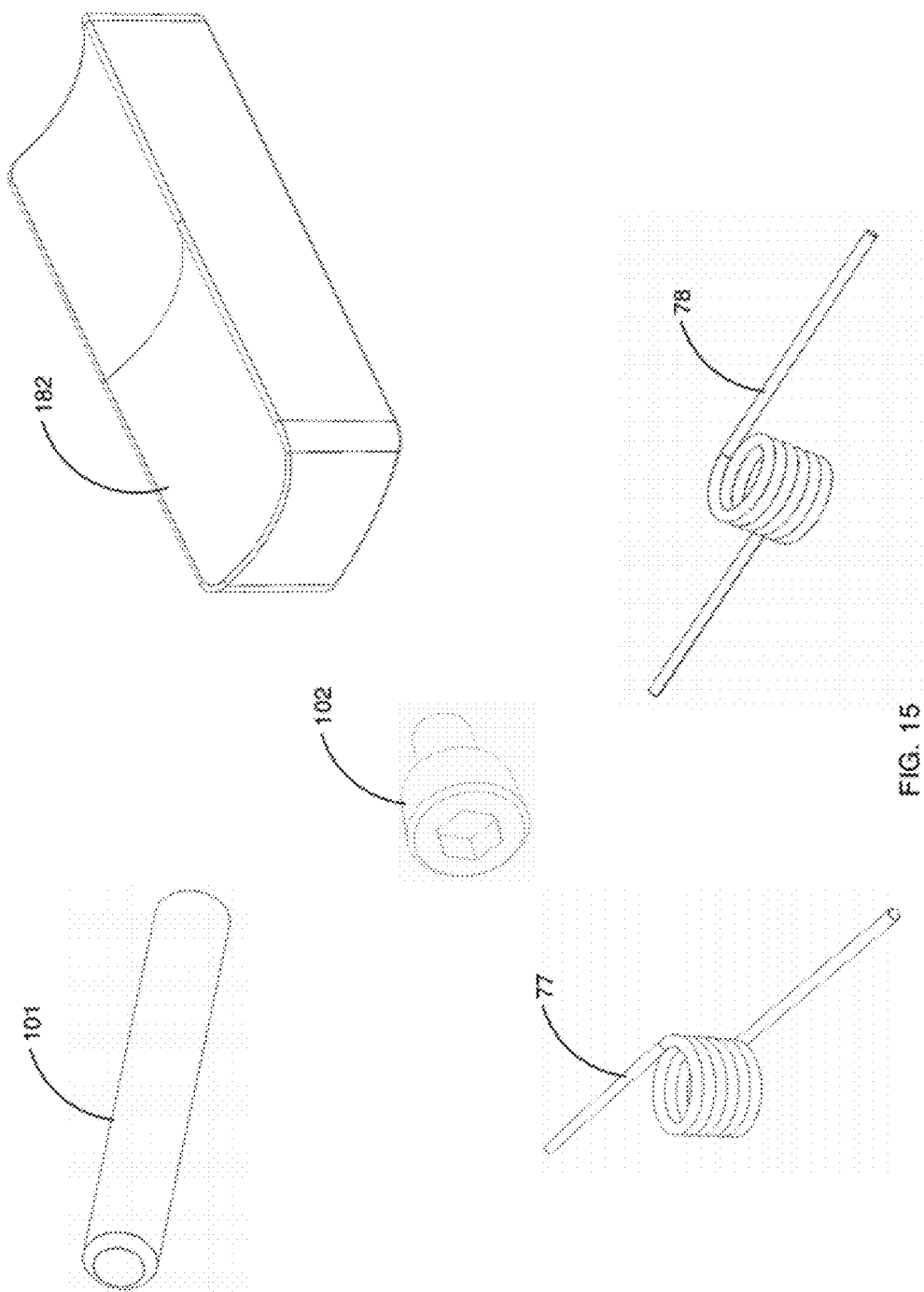

QUICK RELEASE FLY REEL ADAPTER

CROSS-REFERENCE TO RELATED APPLICATION

The present invention claims priority to U.S. Provisional Patent Application Ser. No. 61/494,746 filed on Jun. 8, 2011, the entirety of which is incorporated by this reference.

BACKGROUND

1. Field of the Invention

The present invention relates generally to fly fishing rods and reels and more specifically to an apparatus configured to allow a fly angler to quickly remove a fly reel from a fly rod while fishing.

2. State of the Related Art

Fly-fishing is an angling method in which an artificial 'fly' is used to catch fish. The fly is cast using a fly rod, reel, and specialized weighted line. Casting a nearly weightless fly or 'lure' requires casting techniques significantly different from other forms of casting. Fly fishermen use flies that resemble natural insects and forms thereof or other food organisms, or lures to provoke the fish to strike.

Fly-fishing can be done in fresh or salt water. North Americans usually distinguish freshwater fishing between cold-water species (trout, salmon, steelhead) and warm-water species, notably bass. Techniques for fly-fishing also differ with habitat (lakes and ponds, small streams, large rivers, bays and estuary and open ocean.) In fly-fishing, fish are caught by using artificial flies that are cast with a fly rod and a fly line. The fly line is heavy enough to send the fly to the target. The main difference between fly fishing and spin or bait fishing is that in fly fishing the weight of the line carries the hook through the air, whereas in spin and bait fishing the weight of the lure or sinker at the end of the monofilament or braided line gives casting distance. Artificial flies are of several types; some imitating an insect (either flying or swimming), others imitating a bait fish or crustacean, and still others include attractors that attract fish although they look like nothing in nature. Flies can be made either to float or sink, and range in size from a few millimeters to 30 cm long; most are between 1 and 5 cm. Artificial flies are made by fastening hair, fur, feathers, or other materials, both natural and synthetic, onto a hook. The first flies were tied with natural materials, but synthetic materials are now popular and prevalent. Flies are tied in sizes, colors and patterns to match local terrestrial and aquatic insects, baitfish, or other prey attractive to the target fish species.

Traditional fly rod/reel configurations pose certain problems for anglers. The weight of the reel attached to the fly rod in a conventional manner requires a certain force to achieve a desired line speed. As a result, frequent casts can cause fatigue. In addition, a common problem faced by anglers is the line wrapping around the fly reel at the end of a cast. Also, once a fish is hooked, the angler must hold the rod while trying to net the fish, which can be challenging at best and result in fatigue and/or loss of the fish.

One attempt in the art to address the deficiencies of a traditional fly rod/reel configuration is set forth in U.S. Pat. No. 7,086,195 to Borgeat that issued Aug. 8, 2006. Borgeat discloses a fly fishing rod with a detachable reel and reel seat assembly. The fly fishing rod comprises a rod shaft and a handgrip disposed at an inner end rod shaft, and is adapted for removably connecting a reel to the handgrip by means of a hollow cylindrical reel seat. The rod shaft of the fly fishing rod has a portion extending past the handgrip so as to mount the reel thereon through the reel seat, rearwardly of the handgrip. A sleeve like adapter is engaged over the shaft portion and comprises a locking groove. The reel seat is slidable over the adapter and has a stud portion arranged to be engaged in the locking groove for connecting the reel seat to the handgrip, and to be removed thereon by disengaging the stud portion from the locking groove, thereby making it possible to dispose the reel seat away from the fly fishing rod. Borgeat, however, requires the manufacture of a modified fly rod and therefore cannot readily be used with an existing conventional fly rod.

Thus, there exists a need in the art to provide a fly fishing rod/reel combination that allows a conventional rod to be separated from a conventional reel while fishing. Such a rod/reel combination allows the angler to cast the fly rod without having the reel attached to rod. This removes the weight of the reel and drastically lightens the rod allowing the angler to cast with much less effort. The lightened rod also allows the angler to generate greater line speed with less effort. Cross-body casts and back casts become much easier without the weight of the reel on the rod. Such a rod/reel combination also eliminates the possibility of the line from becoming entangled around the reel. Also, once a fish is hooked, the angler can support the fish separate from the rod. This transfers most of the pull of a strong fish from the angler's arm to reduce arm fatigue. Moreover, there is also a need to provide a rod holder allowing the angler to use both hands to tie on a new fly or leader.

SUMMARY OF THE INVENTION

Accordingly, the present invention provides an apparatus for coupling a conventional fishing rod to a conventional reel comprises a rod mount having a reel foot for attachment to a reel seat of a fishing pole and a first body defining a first attachment portion. A reel mount includes a rod seat for attachment to a reel foot of a fishing reel and a second body having a second attachment portion configured to be selectively and releasably attached to the first attachment portion of the first body. A support arm includes a retaining portion configured to be selectively and releasably attached relative to the reel mount. A latch is coupled relative to the reel mount to selectively secure the reel mount to the rod mount and is configured for being movable by a user from a first position where the rod mount is secured to the reel mount to a second position where the rod mount can be separated from the rod mount.

In one embodiment, the first attachment portion of the rod mount comprises a pair of inwardly extending flanges defining a longitudinally extending channel and the second attachment portion of the reel mount comprises a pair of longitudinally extending grooves for receiving the pair of flanges in a sliding arrangement.

In another embodiment, the first body of the rod mount defines a recess therein and further comprising a weight configured in size and shape to fit within the recess for selectively weighting the rod mount.

In yet another embodiment, the latch comprises an upwardly extending protrusion for selectively engaging the rod mount when in the first position to secure the rod mount to the reel mount.

In still another embodiment, the latch comprises a downwardly extending protrusion for selectively engaging the support arm when in the second position to secure the reel mount to the support arm.

In another embodiment, the latch further comprises at least one laterally extending arm to allow a user to pivot the latch from the first position to a third position in which the upwardly extending protrusion is disengaged from the rod mount to allow the rod mount to be removed from the reel mount.

In still another embodiment, the reel mount defines a longitudinally extending recess configured for receiving at least a portion of the latch therein.

In yet another embodiment, an aperture is in communication with the longitudinally extending recess for receiving a retaining portion of the support arm therein, the latch positioned above the retaining portion of the support arm.

In another embodiment, the retaining portion or the support arm defines a transversely extending notch for engaging the downwardly extending recess of the latch.

In yet another embodiment, the latch is biased relative to the reel mount to force the proximal end of the latch toward the rod mount.

In still another embodiment, a harness is configured for being attached to a user and wherein the support arm is coupled to the harness.

In another embodiment, the harness further comprises a chest plate and a plurality of straps for securing the chest plate to a torso of a user.

In still another embodiment, the support arm is pivotally coupled to the chest plate to allow the support arm to be secured at one of a plurality of angles relative to the chest plate.

In another embodiment, the reel mount comprises an end cap defining an arcuate recess in one side thereof for receiving one end of a reel foot, the end cap configured for being attached to a distal end of the reel mount.

In yet another embodiment, the reel mount defines a transversely extending recess with the laterally extending arm positioned therein.

BRIEF DESCRIPTION OF THE DRAWINGS

FIGS. 8A and 8B are perspective top views of a reel mount in accordance with the principles of the present invention.

FIG. 9 is a perspective left side view of a latch according to the principles of the present invention.

FIG. 10 is a perspective end view of a cap in accordance with the principles of the present invention.

FIG. 15 are side views of various components of the apparatus for coupling a fishing rod to a fishing reel in accordance with the principles of the present invention.

DETAILED DESCRIPTION OF THE ILLUSTRATED EMBODIMENTS

Those of ordinary skill in the art will realize that the following description of the present invention is illustrative only and not in any way limiting. Other embodiments of the invention will readily suggest themselves to such skilled persons.

Figure 1:
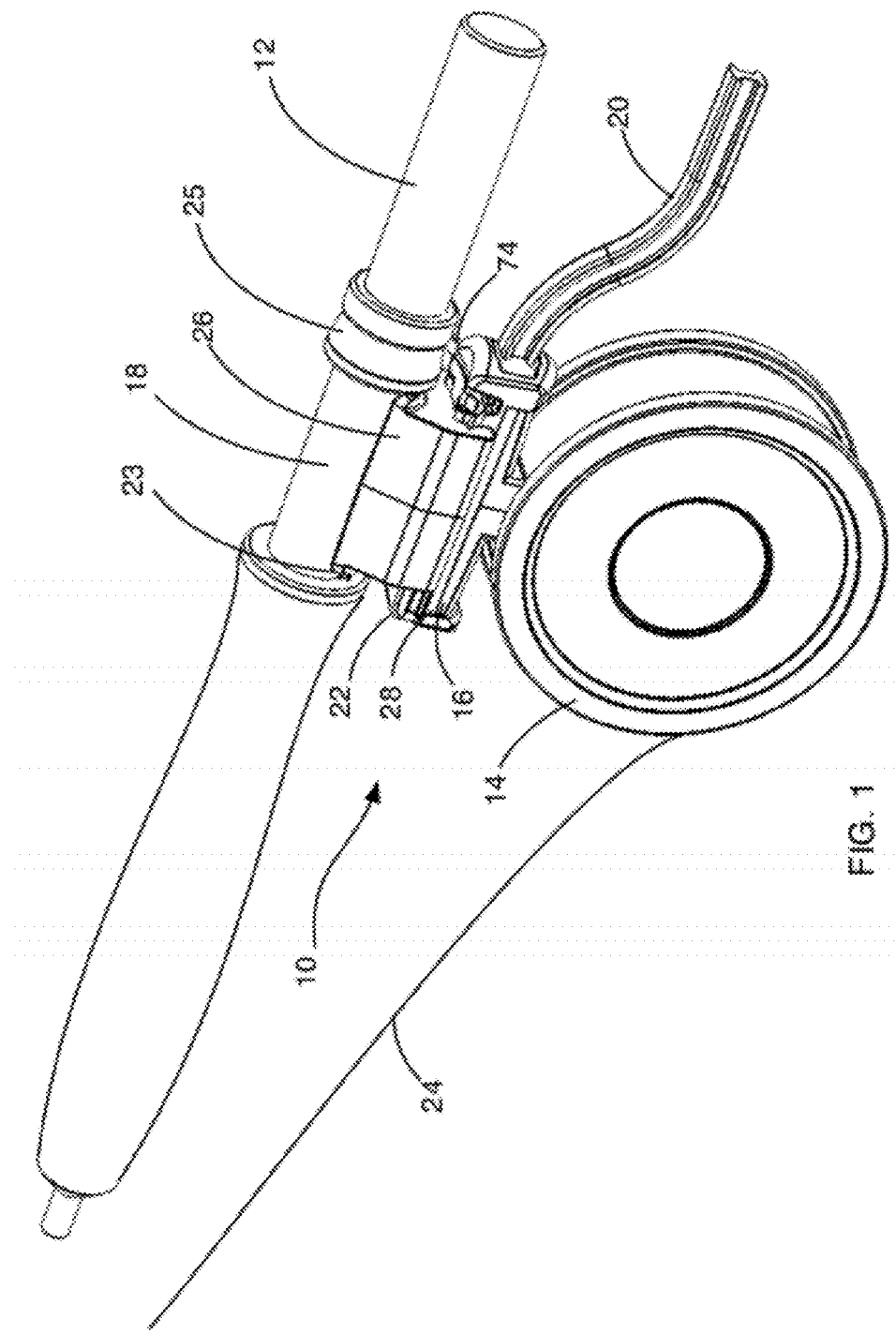
FIG. 1 is a perspective left side view of an apparatus for coupling a fishing rod to a fishing reel in accordance with the principles of the present invention.
Figure 2:
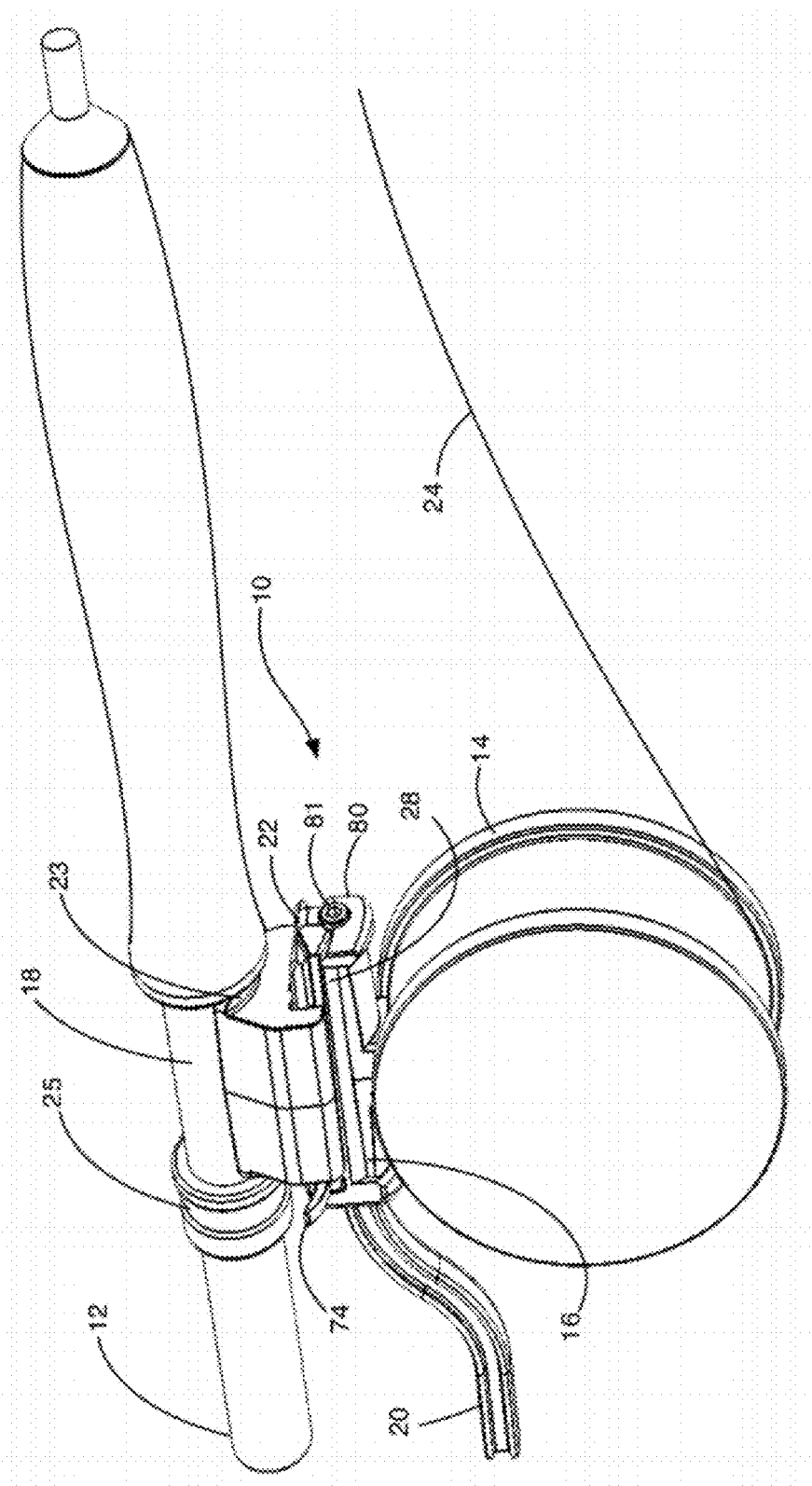
FIG. 2 is a perspective right side view of the apparatus illustrated in FIG. 1.

As shown in FIGS. 1 and 2, the present invention comprises a selectively releasable reel-to-rod adapter 10 that couples a conventional fly fishing rod 12 to a conventional reel 14. The adapter 10 fits between the reel foot 16 of the fly reel and the reel seat 18 of the fly rod 12. It is important to note that the adapter 10 is compatible with conventional fly rods and fly reels, and thus does not require that the fly reel or rod be modified in any way in order to work with the adapter 10 of the present invention. In one embodiment the adapter 10 is configured to work with all fly reels and fly rods that are constructed in accordance with the standards set by the American Fly Fishing Trade Association, which include certain dimensions for the reel foot 16 and reel seat 18.

The adapter 10 includes an elongate mounting member 20 (hereinafter referred to as the "rod/reel mount 20" or the "support 20") that extends in a proximal direction toward the angler and is releasably coupled to the body 22. The rod/reel mount member 20 allows the adapter 10 with the fly reel 14 attached to be attached to a chest harness (described herein below) that is secured to the chest of a fly angler. The chest harness can be integrated into a chest pack or vest. When the fly reel 14 is attached to the chest harness and separated from the pole 12, it can be fully utilized in that position with several advantages over the conventional configuration where the reel is directly attached to the rod.

The adapter 10 allows the fly rod 12 to be quickly released from and reattached relative to the fly reel 14. When the rod 12 is released from the reel 14, the fishing line 24 is the only component of the rod/real assembly that interconnects the rod 12 and reel 14. To reconnect the rod 12 to the reel 14, the rod mount 26 is reconnected to the reel mount 28, which in turn causes the reel mount 28 to be disengaged from the rod/reel mount member 20 that may be secured to the angler's chest. This allows the angler to fight or 'play' the fish with the rod/reel combo as is traditionally done.

Figure 3:
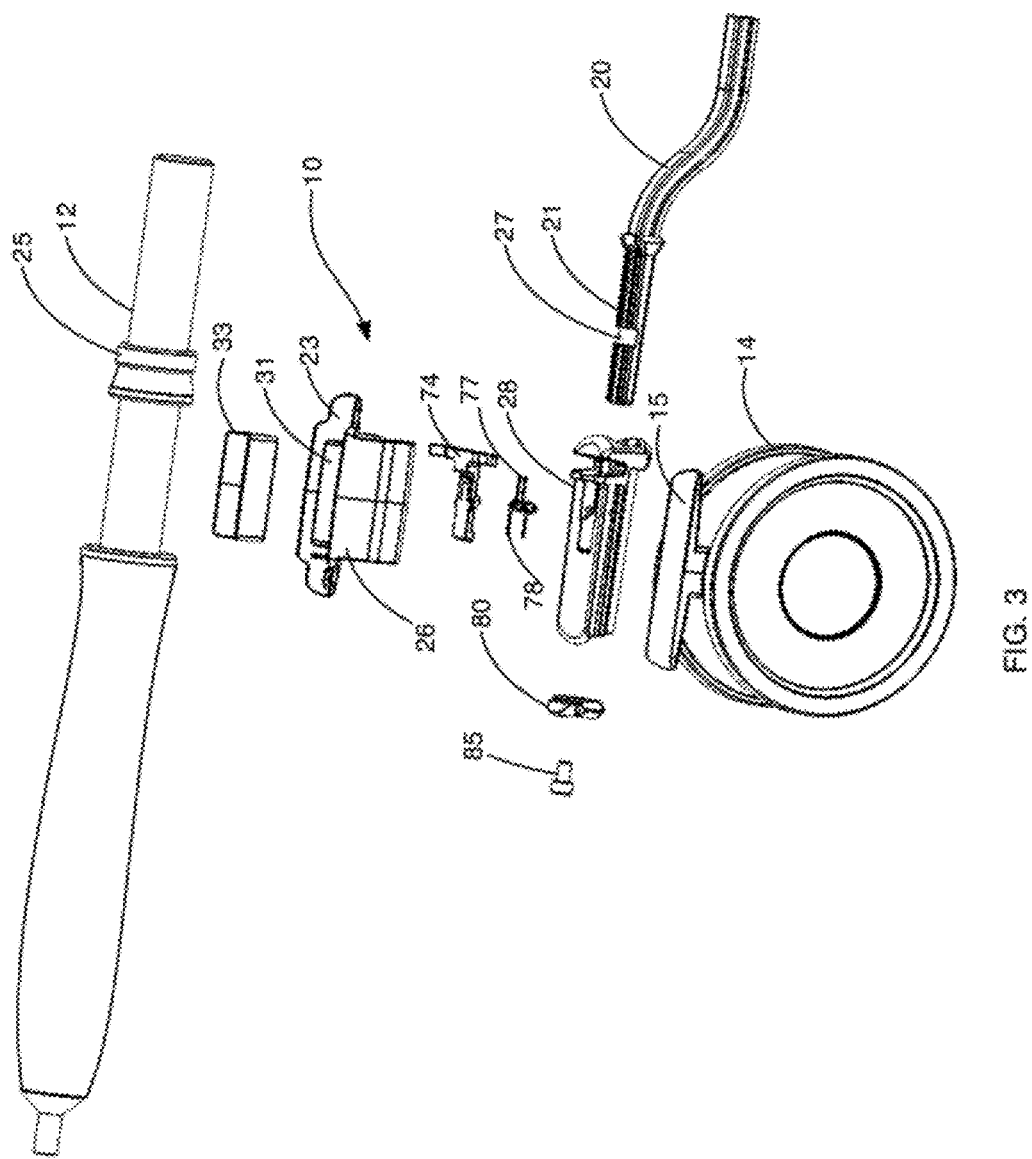
FIG. 3 is a perspective, exploded left side of the apparatus illustrated in FIG. 1.

FIG. 3 is an exploded view of the adapter 10, fly rod 12 and fly reel 14. The adapter is comprised essentially of four primary components. The rod/reel mount member 20 is comprised of an elongated beam having an I-beam cross section that is adapted to be coupled to a body harness (as shown and described below) at a proximal end and includes an insert portion 21 for being inserted and selectively secured to the adapter 10. The support member 20 has a generally S-shaped curvature so as to provide proper positioning of the rod 12 and reel 14 relative to the user when attached to the support member 20. The insert portion 21 has a transversely extending notch 27 for being engaged and selectively secured within the reel mount 28. The reel mount 28 is comprised of an elongated body having a clamping structure, which includes a reel mount cap 80 that is attached to the distal end of the reel mount 28 with a threaded fastener 85. The reel mount 28 includes a recess at a proximal end for receiving a corresponding end of the reel foot 15 of the reel 14. Likewise, the mount cap 80 defines a recess for receiving the distal end of the reel foot 15. When the fastener 85 is secured through the mount cap 80 into the reel mount 28 with the reel foot positioned along the bottom of the reel mount 28, the reel foot 15 is secured to the reel mount 28.

A latch 74 is a generally T-shaped member having user graspable portions that extend from the body portion. The body portion is configured to fit within the reel mount 28 and to be pivotable therein. Biasing members 77 and 78 in the form of coil springs are provided to bias the latch 74 relative to the reel mount 28 so that the latch 74 will engage the notch 27 to prevent the support member 20 from being disengaged from the reel mount 28 when properly inserted therein.

The rod mount 26 is provided with an upper reel foot 23 similar in configuration to the reel foot found on a conventional fly reel. The rod mount 26 is coupled to the reel seat 18 of the fly rod 12 and secured with the threaded ring(s) 25 that tighten the foot 23 to the fly rod 12. The reel foot 23 defines a recess 31 for receiving a weight 33 therein. The weight 33 is provided so as to provide proper weight balance and feel to the fly rod 12 when the rod 12 is selectively removed from the reel 14 by the user when using the adapter 10 of the present invention. The weight 33 may have a weight less than the weight of the reel 14 up to a weight characteristic to the fly rod 12 similar to that as when the reel 14 is attached to the rod. As will be explained herein, pressing down on the latch 74 causes the latch to disengage from the rod mount 26 and allows the user to slide the rod mount 26 and attached rod 12 away from the reel mount 28 to separate the rod 12 from the reel 14. When the rod mount 26 is removed from the reel mount 28, the latch 74 is further biased by springs 77 and 78 to cause the distal end of the latch to engage the notch 27 in the support member 20, thus securing the reel 14 to the support member 20 through the reel mount 28.

Figure 4:
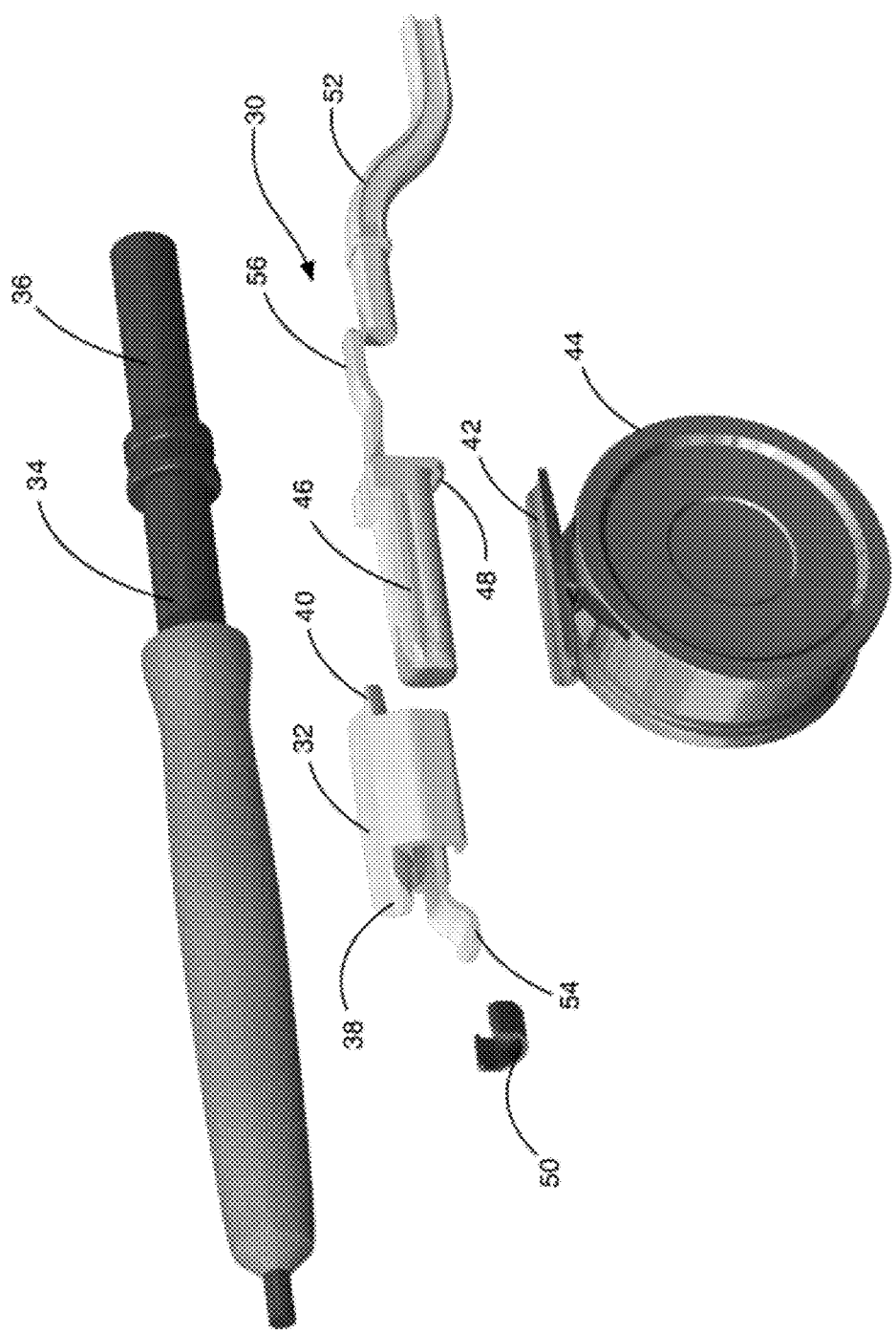
FIG. 4 is an alternative embodiment of an apparatus for coupling a fishing rod to a fishing reel in accordance with the principles of the present invention.

FIG. 4 is an exploded view of an alternative embodiment of a reel-to-rod adapter, generally indicated at 30 in accordance with the present invention. The adapter 30 is comprised of a rod mount 32 having a top portion in the form of a reel foot configured for mounting to the reel seat 34 of the pole 36. Thus, the rod mount 32 includes flanges 38 and 40 configured similarly to the reel foot 42 of the fly reel 44. A reel mount 46 is configured to slidably engage and releasably connect to the rod mount 32 and includes a rearward recess 48 at a lower portion thereof for receiving one end of the reel foot 42. A reel mount cap 50 is configured to attach to the opposite end of the reel mount 46 and to receive and secure the front end of the reel foot 42 to the reel mount 46. As shown in FIG. 2, a cap screw may be employed to attach the reel mount cap to the reel mount.

The reel mount 46 includes an elongate recess extending longitudinally to the reel mount 46 for receiving one end of the reel/pole support member 52 therein. The support member 52 and reel mount 46 are configured to be releasably coupled to one another. Latch 54 is provided to allow selective engagement and disengagement of the rod mount 32 relative to the reel mount 46 and latch 56 is configured to allow selective engagement and disengagement of the reel mount 46 to the reel/rod mount 52. Thus, in this embodiment, the adapter 30 includes two levers 54 and 56, one lever 54 for selectively disengaging the pole or rod 36 from the reel 44 and one lever 56 for selectively disengaging the reel mount 46 from the support member 52.

Figure 5:
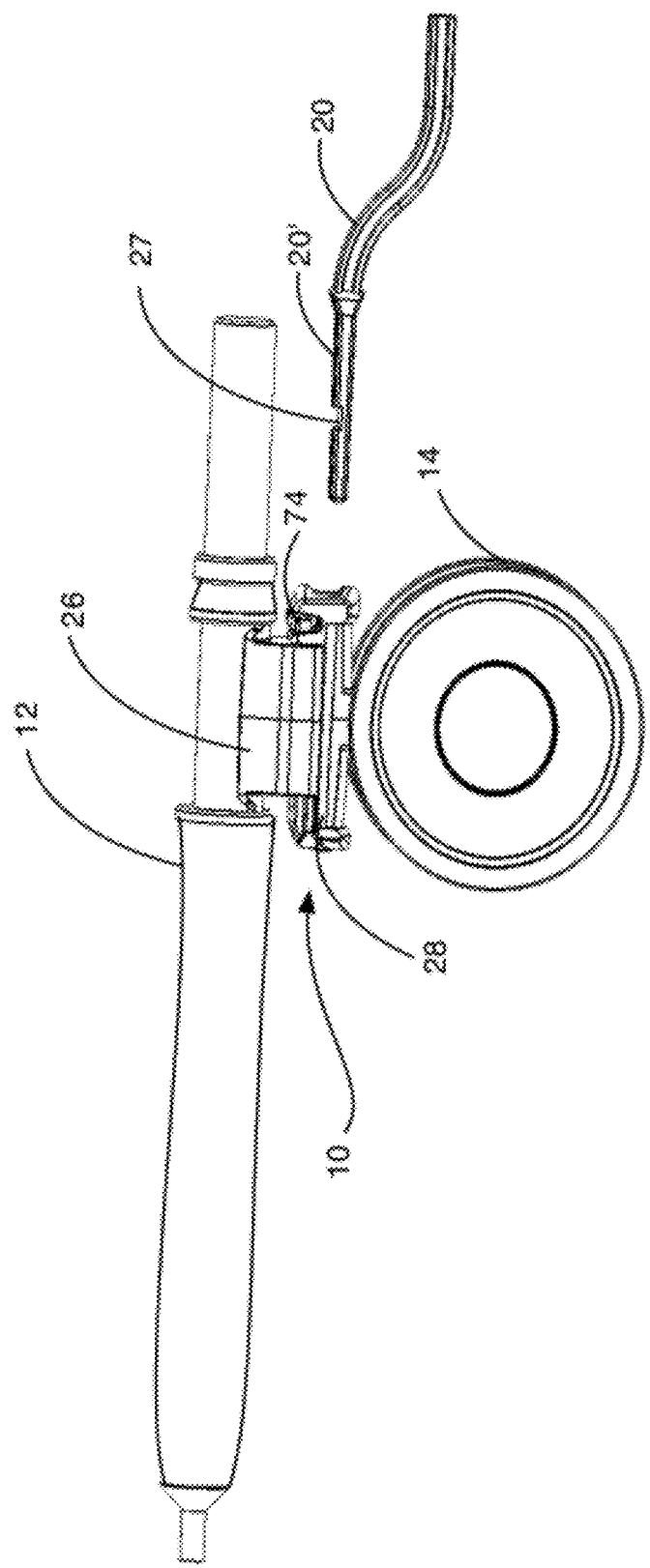
FIG. 5 is a left side view of the apparatus illustrated in FIG. 1.

As shown in FIG. 5, the adapter 10, when secured to the rod 12 and reel 14 can be freely positioned on and removed from the attachment portion 20' of the support 20. As further shown in FIG. 6, by activating the latch 74, that is pressing down on the lever portion 74' in the direction of the reel 14, the rod mount 26 can be separated from the reel mount 28. When the rod and reel mounts 26 and 28 are engaged, the reel mount 28 can be freely slid onto and off of the support 20. Also, when positioned on the support 20, the weight of the rod and reel 12 and 14 is fully supported with the support 20, and more importantly, the attachment portion 20' is upwardly angled from the horizon so that the reel mount 28 does not slide off of the attachment portion 20'. As such, the user can change flies or lures using both hands while having the rod 12 and reel 14 fully supported relative to the harness worn by the user in a hands-free manner. When activating the latch 74, the user grasps and depresses one of the outwardly extending lever portions 74' thereby also holding the reel mount 28 on the attachment portion 20' while sliding the rod mount 26 away from the user and from the reel mount 28. Once the rod 12 is separated from the reel 14, the user releases the lever portion 74'. The distal end of the latch then engages the slot or notch 27 in the support 20 to prevent the reel mount from being separated from the support 20. This allows the rod 12 and reel 14 to be separated while the reel 14 is supported relative to the body of the user in a manner in which the rod 12 can be used to fish separately from the reel 14 while keeping the reel 14 fully supported by the support 20 as shown in FIG. 6 or where the rod 36 and reel 14 can be used together in a traditional manner as shown in FIG. 5.

Figure 6:
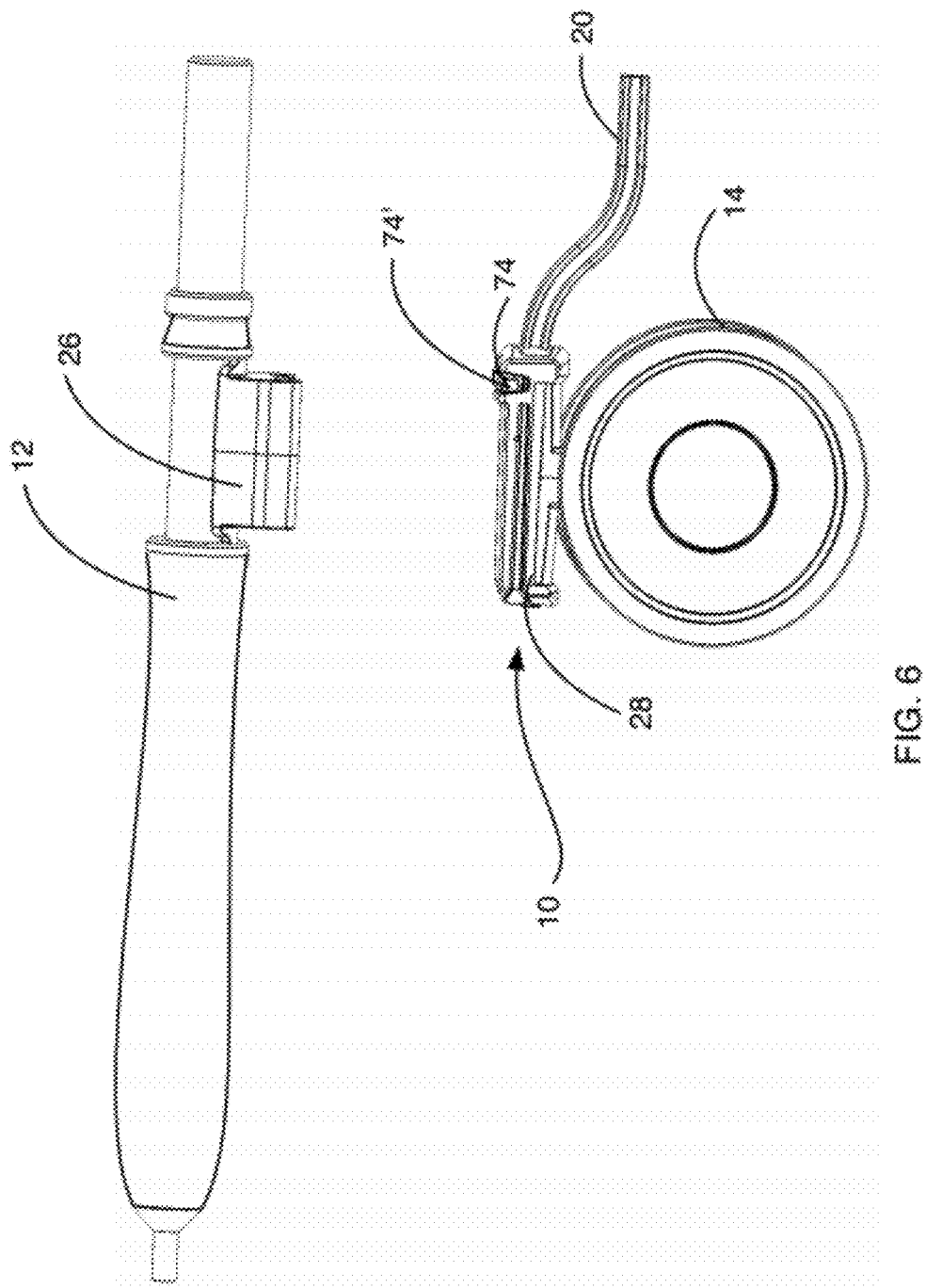
FIG. 6 is a left side view of the apparatus illustrated in FIG. 1.
Figure 7:
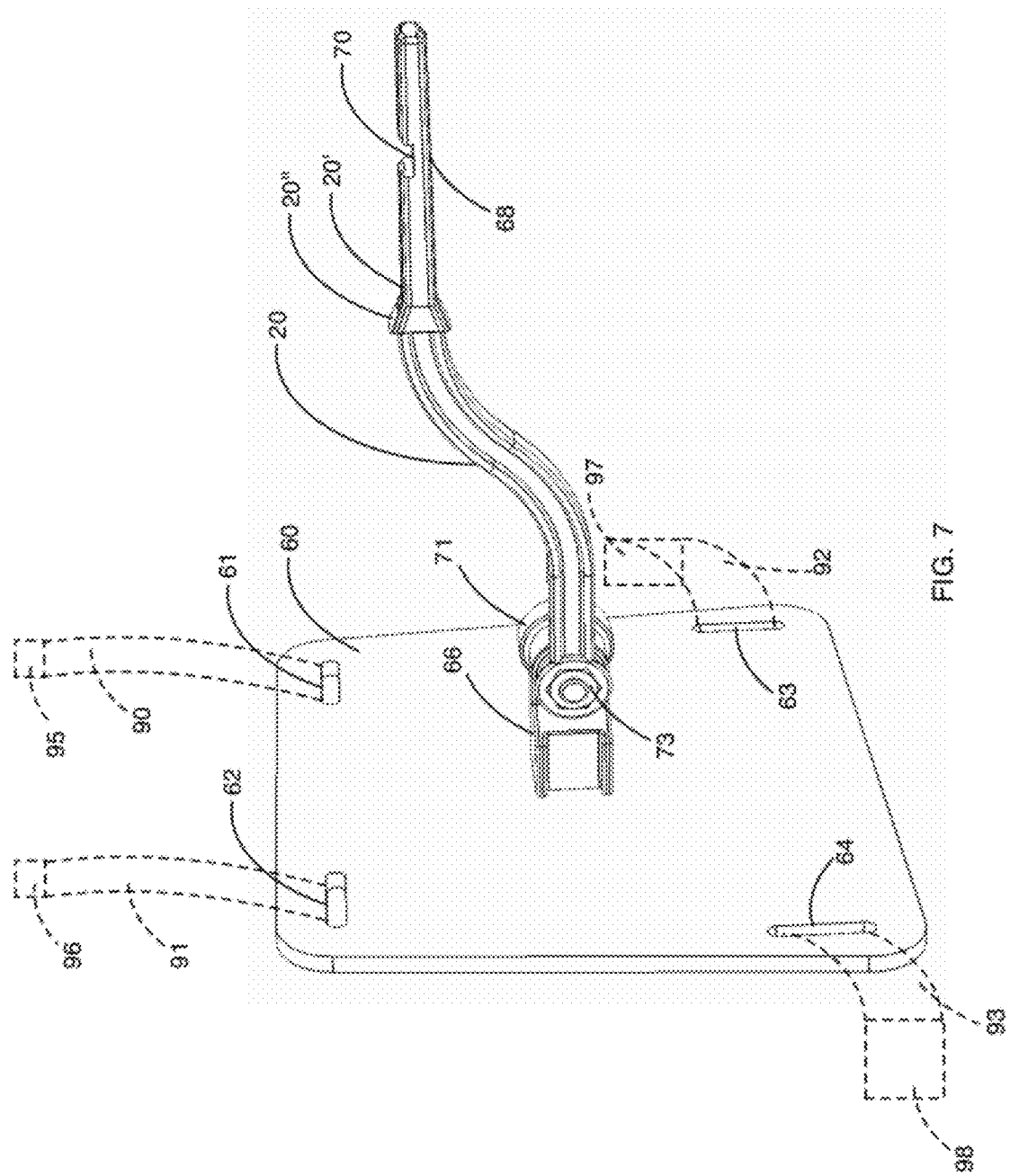
FIG. 7 is a perspective right side view of a harness in accordance with the principles of the present invention.

As shown in FIG. 7, the rod/reel mount 20 shown in FIGS. 5 and 6 is coupled to a chest plate 60 configured with apertures 61-64 for being mounted with straps 90-93 and quick release buckles 95-98, shown in dashed lines, to the chest and around the neck of an angler. The chest plate 60 is formed from a relatively rigid yet lightweight and corrosion resistant material, such as aluminum or various plastic materials known in the art. The chest plate 60 has a thickness, depending on the material from which it is formed, so as to prevent significant flexing of the chest plate 60 when the rod and reel are attached to the support 20. The chest plate also has a size (e.g., 6 in×6 in, 8 in×8 in, 10 in, by 10 in, etc.) sufficient to prevent the arm from being pivoted relative to the torso of a user A support mount 66 is attached to the chest plate 60 and outwardly extends from a center portion of the chest plate 60. The support 20 is vertically pivotally coupled to the support 20 so that the r support 20 can be secured to the support mount 66 at various angles between the support mount 66 and the support 20 so as to upwardly angle the attachment portion 20' of the support 20. A thumb screw 71 and nut 73 pivotally couples the support 20 to the support mount 66 to allow selective vertical angular adjustment between the chest plate 60 and the support 20, thus allowing vertical adjustment between the position of the fly reel on the angler's chest. The end portion 68 of the support 20 is configured to slide within and be secured to the reel mount (previously described). As previously described, a transverse slot 70 is provided to engage with the latch of the reel mount for holding the support in a fixed position relative to the reel mount.

Figure 8B:
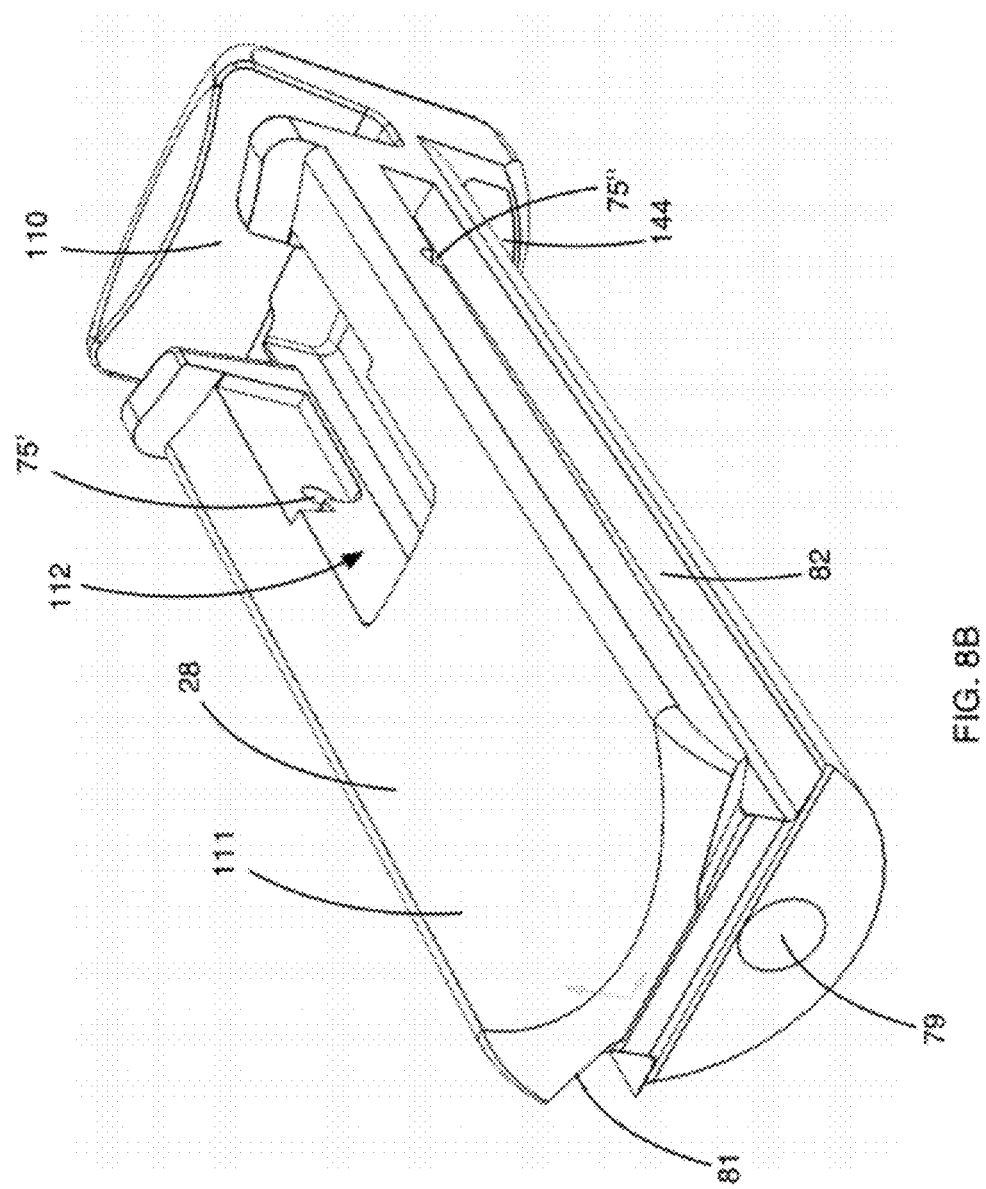

The attachment portion 20' of the support 20 is configured to mate with the aperture 72 formed in a head portion 110 of the reel mount 28 that is separated in part from a body 111 of the reel mount 28 by a T-shaped latch recess 112 as illustrated in FIGS. 8A and 8B. The latch recess 112 is sized and configured to receive the latch 74 therein and to allow pivotal movement of the latch 74 within the latch recess 112 between a first position and a second position. The laterally extending portions 114 and 116 of the latch recess 112 extend to the sides of the reel mount 28 through which the latch handle portions can extend for engaging by a user. The portion 122 of the latch 74 that defines the aperture 76 (see FIG. 9) resides within the side recesses 118 and 119. The side recesses 118 and 119 are defined in part by curved surfaces for engaging the curved portion of the latch 74 that defines the aperture 76 and for guiding the pivotal movement of the latch 74 relative to the reel mount 28. The attachment portion 20' of the support 20 is configured to be releasably held to the reel mount 28 with the latch 74 that is pivotally coupled to the reel mount 28 with a pin 101 (see FIG. 15) that extends through the apertures 75' and 75", and may be press fit or otherwise secured relative thereto, in the reel mount 28 and the aperture 76 in the latch 74 (see FIG. 9). Thus, as will be further described, the latch 74 is partially housed within the reel mount 28 and is biased relative thereto with springs 77 and 78 shown in FIG. 15. The aperture 72 is sized to receive the attachment portion 20' and includes a wider and tapered opening 72' to assist with initial insertion of the attachment portion 20' to make it easier for the user to engage the attachment portion 20' with the aperture 72. The attachment portion 20' is insertable into the aperture 72 until the tapered abutment 20" (see FIG. 7) abuts against the tapered opening 72'. As will be described in more detail, the latch is positioned above the attachment portion 20'.

As shown in FIG. 8B, the reel mount 28 includes a threaded bore 79 for coupling the reel mount cap 80 shown in FIG. 10 to the reel mount 28. Exterior longitudinal channels or slots 81 and 82 are configured to slidably engage with the inwardly extending flanges 83 and 84 of the pole mount 26 shown in FIGS. 11 and 12. The slots 81 and 82 extend a substantial length of the reel mount 28 and are aligned in parallel. The proximal ends of the slots 81 and 82 terminate in an abutment surface so that the engagement of the slots 81 and 82 with the flanges 83 and 84 is limited and is only in one direction. Thus, when the reel mount 28 is coupled to the pole mount 26, the proximal ends of the flanges 83 and 84 of the pole mount 28 will abut against proximal ends of the slots 81 and 82 and the latch 74 will hold the pole mount relative to the reel mount.

As shown in FIG. 9, the latch 74 is a generally T-shaped member comprised of a user engageable portion 74' and a body 120. A lower arcuate portion 122 defines the aperture 76 for coupling the latch 74 to the reel mount. The user engageable portion 74' includes a pair of laterally extending arms 124 and 126 that define upwardly curved ends for receiving a finger or thumb of user to depress the latch 74 in order to release the reel mount from the rod mount as previously described. The body 120 of the latch 74 includes an elongate portion extending distally from the user engageable portion 74'. The body 120 has a thinner profile than the user engageable portion 74' and includes a protrusion 128 having a triangular shape. The distal end of the protrusion defines a ramp for allowing the ramp to slide along a bottom surface of the rod mount until an engaging portion depresses the protrusion 128 until it passes over the protrusion 128 and locks behind the protrusion 128 as the latch 74 is upwardly biased. The distal end of the latch 74 also includes a distal retaining portion 130 that extends downwardly from the body portion 120 of the latch 74. The retaining portion 130 engages the notch in the support 20 when the rod mount is removed from the reel mount and prevents the reel mount from being removed from the support member 20 unless the latch 74 is sufficiently depressed.

As illustrated in FIG. 10, the mount cap 80 defines a centrally located aperture 140 that extends therethrough for securing the mount cap 80 to the distal end of the reel mount via the bore 79 (see FIG. 8B). The mount cap 80 further includes an arcuate recess 142 in a proximal side thereof configured for receiving one end of a reel foot. A similarly configured recess 144 (see FIG. 8B) is formed in the distal side of the head portion 110 of the reel mount 28. The reel foot is positioned within and between the recess 142 and the recess 144, and when the mount cap 80 is secured to the reel mount 28 with the fastener 102 (see FIG. 15) tightens and secures the reel foot to the reel mount 28. The mount cap 80 also includes an upper portion 80' having a width that is no wider than the distance between the two slots 81 and 82 in the reel mount 28 so as to allow the rod mount to slide from the reel mount 28 and past the mount cap 80, with the lower portion 80" being wide enough to include the arcuate recess for receiving at least one or more standard sized reel feet.

Figure 11:
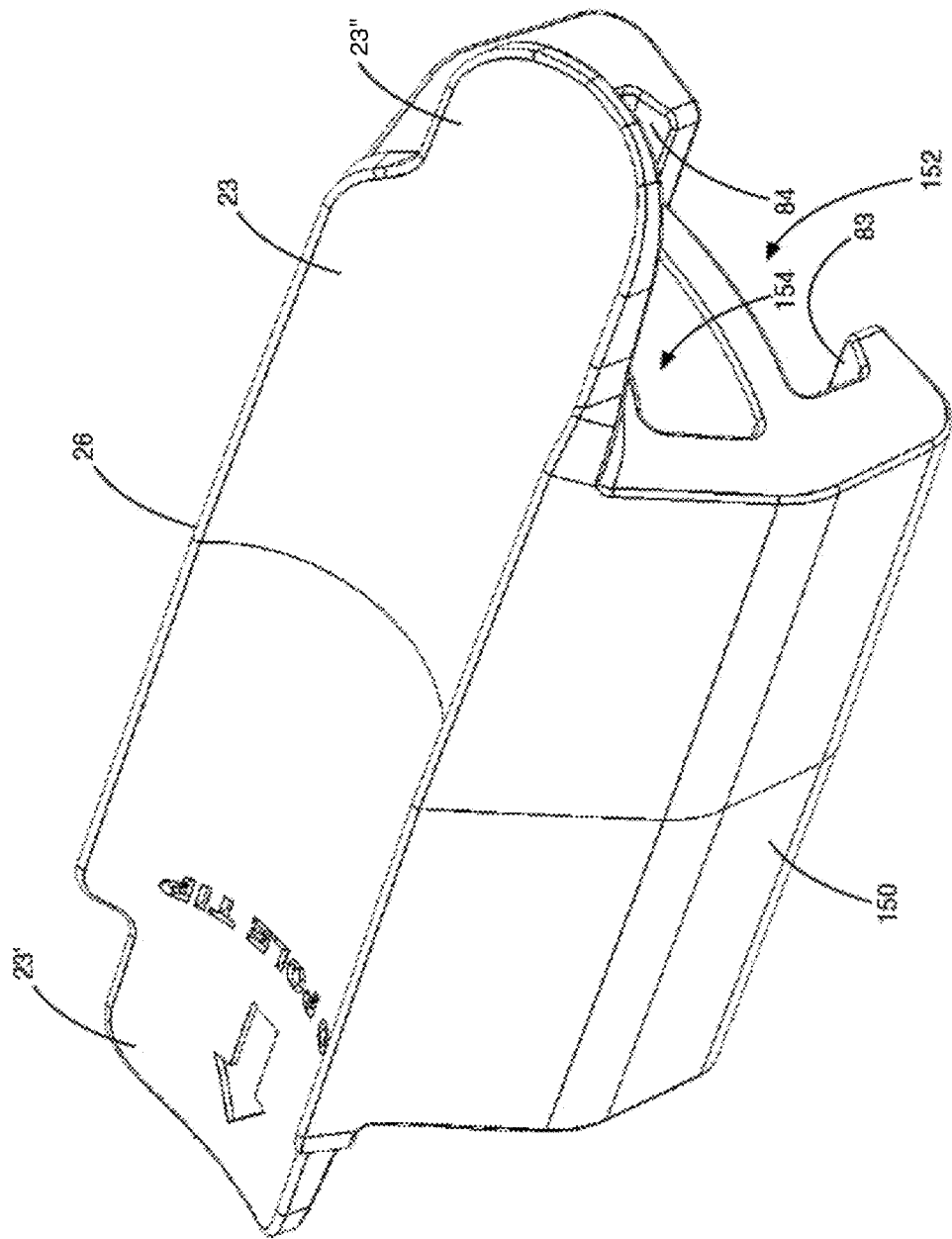
FIG. 11 is a top perspective view of a rod mount in accordance with the principles of the present invention.
Figure 12:
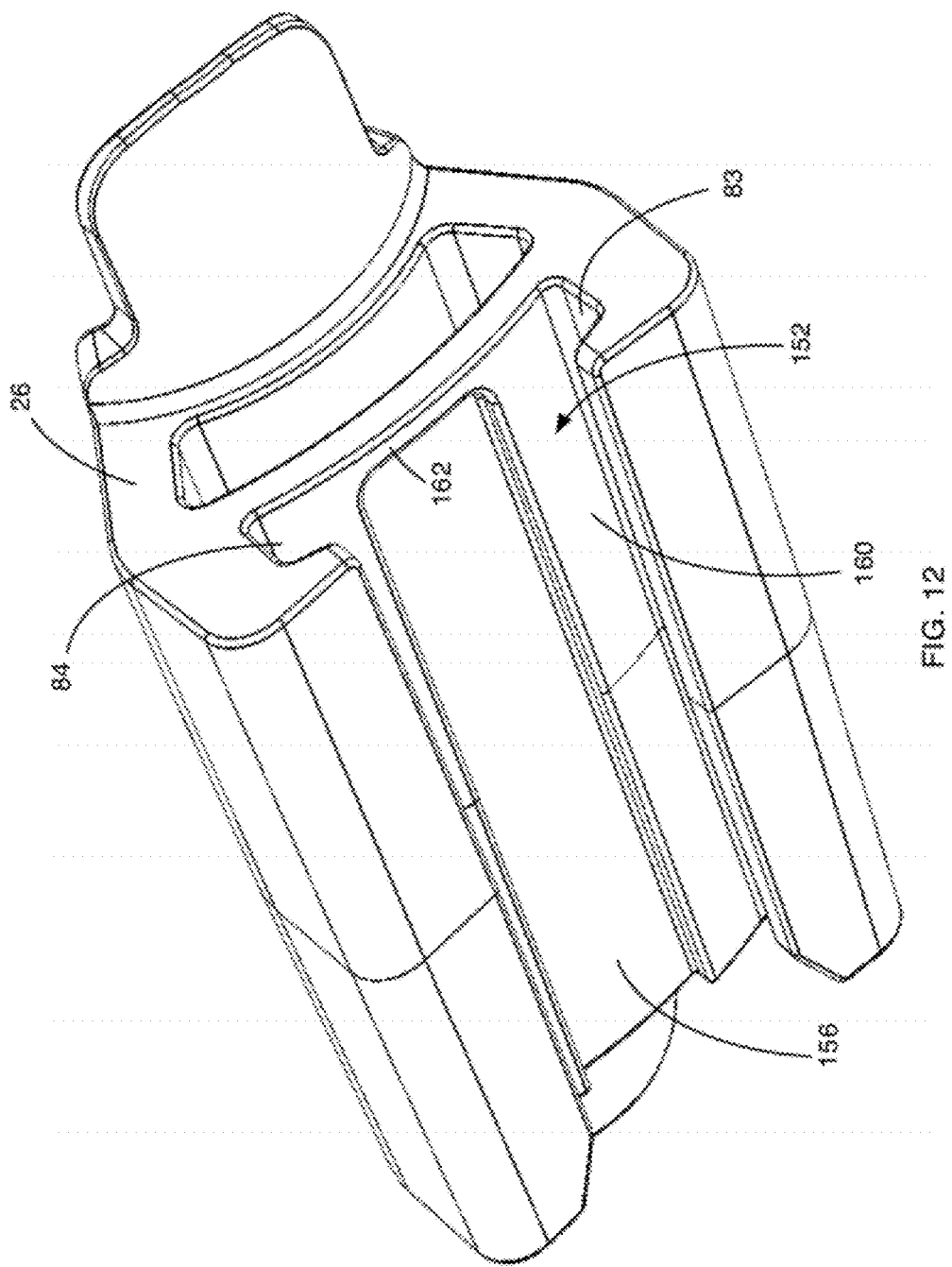
FIG. 12 is a bottom perspective view of the rod mount illustrated in FIG. 11.

FIGS. 11 and 12 illustrate the pole or rod mount 26 according to the present invention. The support 26 provides a longitudinally extending reel foot 23 having first and second arcuate extension portions 23' and 23". The extension portions 23' and 23" are configured to be attachable to a reel seat of a fishing pole, such as a fly rod. Indeed, the reel foot 23 has a concave contour along its longitudinal length to receive the reel seat of the fly rod. Spaced below the reel foot 23 is an attachment portion 150 that defines a longitudinally extending channel 152 along the bottom side thereof. The channel 152 has a C-shaped configuration and is further defined by inwardly extending flanges 83 and 84 that extend the length of the channel 152 and are configured to be slidedly engageable within the corresponding longitudinally extending channels of the reel mount 28. A longitudinally extending aperture 154 extends the length of the support 26 between the reel foot 23 and the channel 152 for reducing weight of the rod mount 26. As shown in FIG. 12, the channel 152 is further defined by a partially longitudinally extending recess 156 defined by the bottom surface 160 of the rod mount 26. The proximal end of the recess 156 is defined by a transversely extending lip 162 that longitudinally extends between the recess 156 and the proximal end of the support 26. The lip 162 provides a retaining or engageable portion for the latch 74. More specifically, the protrusion 128 of latch 74 (see FIG. 9) is configured to reside within the recess 156 when the after the protrusion 128 passes over the lip. That is, as the rod mount 26 is slid along the reel mount 28, the latch will be pivoted into a position where the distal end of the latch 128 is engaged with and secured to the reel mount 28. As the rod mount is slid onto the reel mount 26, eventually, the lip 162 will engage the protrusion 128 causing the latch 74 to pivot until the protrusion 128 passes over the lip 162. At this point, the latch 128 will automatically pivot, since it is biased with springs 77 and 78 (see FIG. 15), at its proximal end toward the rod mount 26 to retain the rod mount 26 to the latch 128 and thus to the reel mount 28. Essentially, the lip 162 provides a catch for the protrusion 128 of the latch 74.

Figure 13:
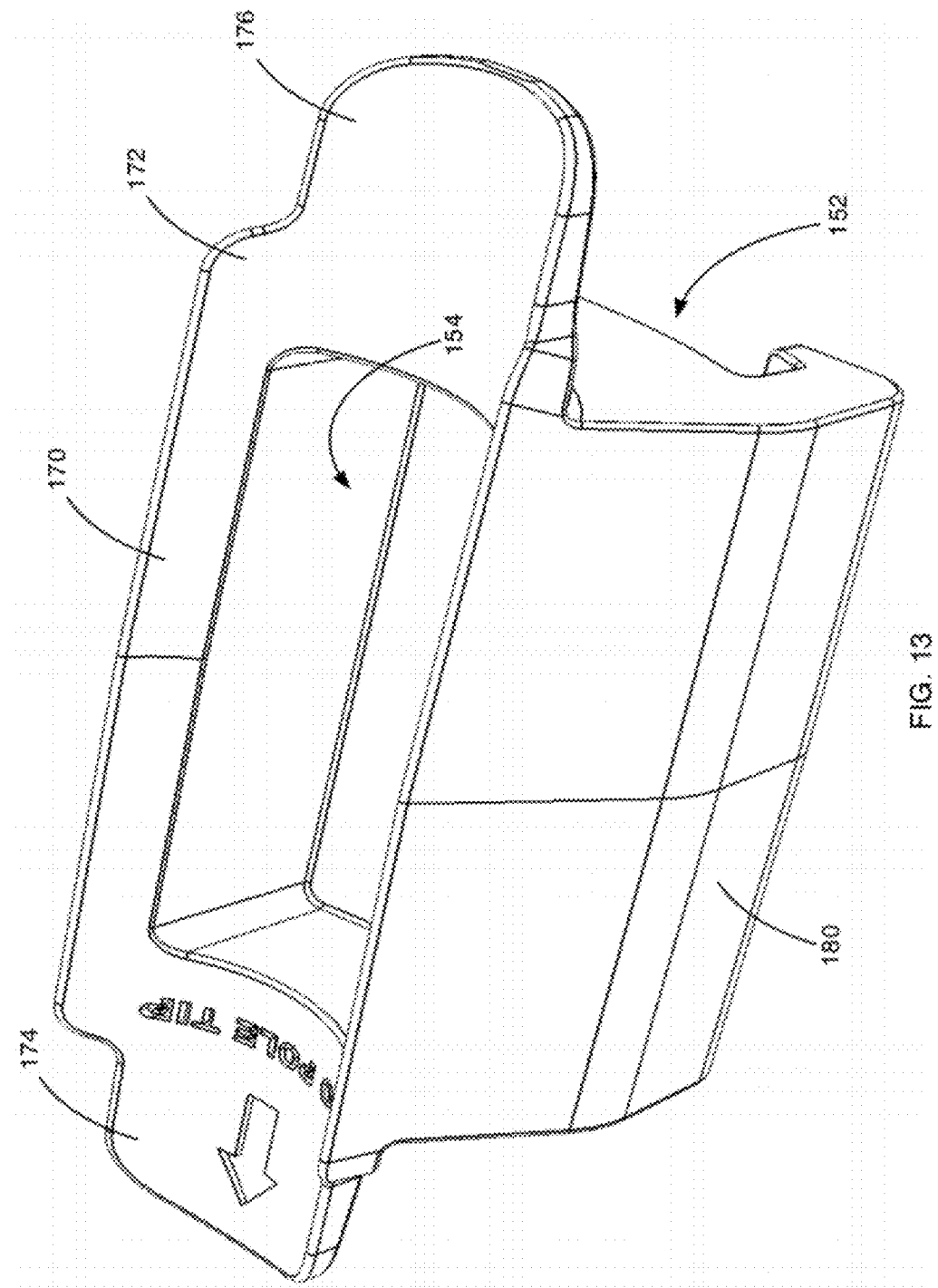
FIG. 13 is a top perspective view of an alternative embodiment of a rod mount in accordance with the principles of the present invention.

As illustrated in FIG. 13, an alternative embodiment of a rod mount structure, generally indicated at 170, is configured similarly to the rod mount 26 previously described herein. The rod mount 170 includes a reel foot 172, having longitudinally extending retaining portions 174 and 176 for attachment to the reel seat of a fishing pole. The bottom side defines a C-shaped channel 152 for securing the rod mount 170 to the reel mount, such as reel mount 28 previously described. The body 180 of the rod mount 170 defines a weight receiving recess 154 configured for receiving a weight, such as weight 182 illustrated in FIG. 15. The weight 182 is configured in size and shape to reside within the recess 154 and has an upper surface contour configured to substantially match the surface contour of the top surface of the support 170 that forms the reel foot 172 so as to be retained between the reel seat of the fishing pole and the body 180. The weight 182 may be formed of lead or other relatively heavy material known in the art. The weight 182 is provided to balance the rod if the rod is too light for a particular angler's desires when the rod and rod mount 26 is removed from the reel and reel mount according to the principles of the present invention.

Figure 14:
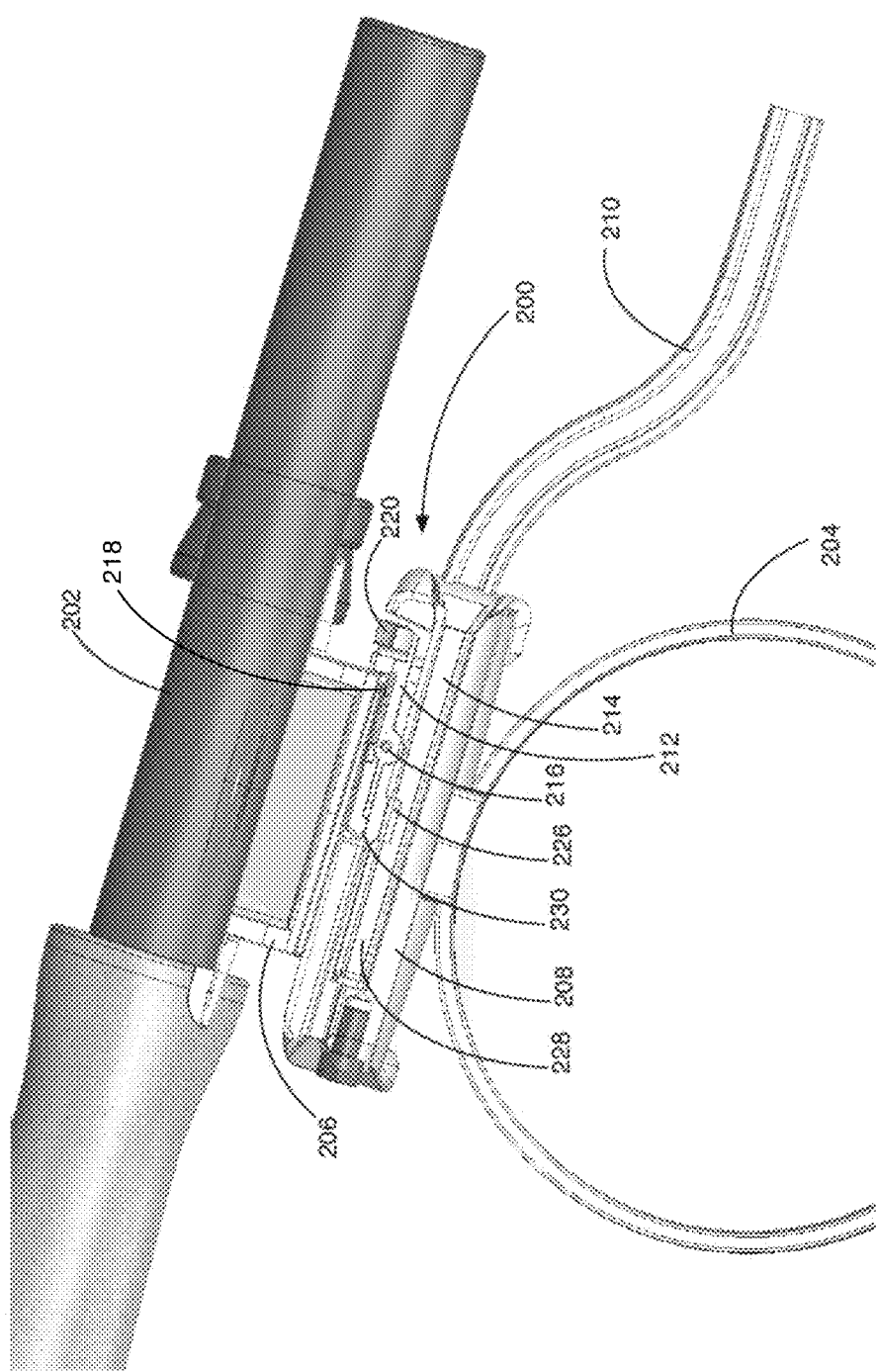
FIG. 14 is a partial cross-sectional side view of an apparatus for coupling a fishing rod to a fishing reel in accordance with the principles of the present invention.

FIG. 14 is a partial cross-sectional side view of a releasable rod/reel attachment apparatus 200 according to the principles of the present invention. When the rod 202 and reel 204 are secured to one another with the rod mount 206 and reel mount 208 and the body support arm 210 is inserted into the reel mount 208 as illustrated, the latch 212 is generally longitudinally oriented relative to the longitudinal axis of the retaining portion 214 of the support arm 210. A latch lever 212 can pivot about an axis that extends through the attachment bore 216, which is generally aligned with a bottom surface of the latch 212. In this first position, the protrusion 218 of the latch lever 212 is engaged with the rod mount 206 so as to retain the rod mount 206 to the reel mount 208. The rod and reel mounts 206 and 208, however, can be freely removed from the support arm 210. When one of the user engageable lever arms 220 is depressed toward the reel mount 208, however, the latch lever 212 is disengaged from the rod mount 206 so that the rod mount 206 can be slid from the reel mount 208. After the rod mount 206 is removed from the reel mount 208 and the lever arm 220 is released, the latch lever 212 will pivot to a second position where the distal end of the latch lever 212 engages a channel 226 formed in the retaining portion 228 of the support arm 210. The distal end of the latch lever 212 includes a downwardly extending protrusion 230 in the form of a catch for engaging the channel 226 of the support arm 210 so as to secure the reel mount 208 to the support arm 210. When the rod mount 206 is slid back onto the reel mount 208, the latch lever 212 is caused to pivot back to the first position as the latch lever 212 reengages with the rod mount 206 and disengages from the channel 226 of the support arm 210, thus allowing the rod 202 and reel 204 to be removed from the support arm 210 while being secured relative to one another.

Referring again to FIGS. 1 and 2, the rod mount 26 is configured with a foot 23 similar in configuration to the reel foot found on a conventional fly reel. The rod mount 26 is coupled to the reel seat 18 of the fly rod 12 and secured with the threaded ring(s) 25 that tighten the foot 23 to the fly rod 12. In normal use, the foot 23 of the rod mount 26 is positioned under the fly rod 12 with the reel 14 hanging below the rod mount 26.

Springs are provided within the reel mount 28 and are positioned on opposite sides of the latch 74, with the latch pin passing through the springs and the central aperture of the latch 74. One extension arm of the spring is compressed against the body of the reel mount 28 with the other arm compressed by the latch member 74, thus biasing the latch member 74 so as to raise the proximal end of the latch member 74.

The reel mount 28 includes a cavity at its proximal end that allows the support 20 to be inserted into the reel mount 28. As the support 20 is inserted into the reel mount 28, the top leading edge of the support 20 presses against the latch 74 to lift the latch 74 while depressing the rear of the latch 74 to compress the springs. The support 20 has a transversely extending notch in the top thereof that is configured to engage with the latch 74. In an alternative configuration, when the support 20 is fully inserted into the reel mount 28, the proximal bottom edge of the latch 74 is forced into the notch of the support 20 as a result of the bias imposed by the springs. Once the latch 74 is engaged into the notch of the support 20, the reel mount is securely attached to the support 20, which is in turn attached to the chest plate 60 and the chest of the angler, as well as securely attached to the rod mount. When the support 20 is fully inserted into the reel mount 28, the proximal end of the latch 74 is elevated relative to the reel mount 28. The side extensions at the proximal end of the latch 28 allow the angler to press down the proximal end of the latch 74, thus causing the distal end of the latch to rise. This causes the latch 74 to disengage from the notch of the support 20 and the proximal end from rod mount 26. The reel mount can then be released from the support 20 by pushing the reel mount forward, away from the angler, while the proximal end of the latch 74 is depressed or the rod mount 26 can be separated from the reel mount while retaining the reel mount on the support by holding the latch relative to the support.

Likewise, the apparatus of the present invention can be configured so that the reel mount 28 is automatically released from the support 20 whenever the rod mount 26 is attached to the reel mount 28. Channels on both side of the reel mount 28 extend longitudinally and are configured in size and shape to receive inwardly extending portions of the rod mount 26 in a tongue-and-groove relationship.

The angler can attach the chest plate 60 to their upper torso with nylon straps and quick release buckles. They can then adjust the support mount 66 to an angle and distance the reel will be positioned relative to their upper torso. The reel mount 28 is attached to the fly reel with the reel mount cap 80 and a cap screw. The reel 14 can then be quickly slid onto either the support 20 or the rod mount 26.

When the reel mount 28 and fly reel 14 are attached to the support 20, the angler is able to cast the fly rod 12 without having the reel 14 attached to rod 12. This removes the weight of the reel 14 and drastically lightens the rod 12 allowing the angler to cast with much less effort. The lightened rod 12 also allows the angler to generate greater line speed with less effort. Cross-body casts and back casts become much easier without the weight of the reel 14 on the rod 12.

In addition, a common problem faced by anglers is the line 24 wrapping around the fly reel 14 at the end of a cast. The present invention eliminates this problem. Once a fish is hooked, the angler can choose to play the fish from the chest plate and associated support 20 since the reel is coupled to the chest plate when the rod is removed. This transfers most of the pull of a strong fish from the angler's arm to their chest reducing arm fatigue. Alternatively, the angler can simply slide the rod mount 26 along with the rod 12 back onto the reel mount 28. This action automatically disengages the reel mount 28 from the chest harness support 20 and locks the reel mount 28 onto rod mount 26. The fly reel 14 and rod 12 are now connected and positioned as they would be in a traditional real and rod assembly.

When the reel 14 is attached to the rod 12 via the rod mount 26 and reel mount 28, the rod 12 and reel 14 act and can be used in a traditional fly fishing manner whether in casting or playing a hooked fish.

It is also noted that the present invention also serves as a rod holder allowing the angler to use both hands to tie on a new fly or leader. By adjusting the support 20 relative to the chest plate 66 at an upward angle between about horizontal and vertical or at any angle therein between, the rod 12 can be slid over the reel mount 28 allowing the rod 12 to be help up and fully supported by the chest harness while the angler works on the fly line 24 with both hands.

It will be apparent to those skilled in the art that there may be some other uses, implementations and features for the present invention, including equivalent structures, without departing from the spirit and scope of the present invention. Thus, while there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various embodiments of the present invention are described herein, any structures or components similar or equivalent to those described herein may be used in the practice or testing of the present invention. All references cited herein are incorporated by reference in their entirety and for all purposes. In addition, while various advantages of the present invention are manifested in the illustrated embodiments of the invention, a variety of changes can be made to the features of the invention to achieve those advantages including combinations of structures of the various embodiments. Hence, reference herein to specific details of the structures and arrangement of such structures and components of the present invention is by way of example only and not by way of limitation.

What is claimed is:

1. An apparatus for coupling a fishing rod to a reel, comprising:
   a reel mount comprising a first attachment portion configured for attachment to a reel foot of a fishing reel and a second attachment portion;
   a rod mount comprising a third attachment portion configured for attachment to a reel seat of a fishing pole and a fourth attachment portion selectively removable from the second attachment portion of the reel mount;
   a latch pivotally coupled between the rod mount and the reel mount comprising:
      a lever;
      a first latch portion proximate a first end of the latch selectively securing the reel mount to the rod mount when the latch is in a first position and releasing the reel mount from the rod mount when the latch is pivoted by the lever to a second position allowing the rod mount to be separated from the reel mount by sliding the rod mount from the reel mount; and
      a second latch portion proximate an opposite end of the latch; and
   a support arm configured to be secured proximate a proximal end thereof to a user and having a retaining portion proximate a distal end thereof selectively releasably secured between the reel mount and the rod mount with the second latch portion of the latch, whereby moving the latch from the first position to the second position releases the second latch portion from the support arm to allow the reel mount to be separated from the support arm.

2. The apparatus of claim 1, wherein the third attachment portion of the rod mount comprises a pair of inwardly extending flanges defining a longitudinally extending channel and the second attachment portion of the reel mount comprises a pair of longitudinally extending grooves for receiving the pair of flanges in a sliding arrangement.

3. The apparatus of claim 1, wherein the rod mount defines a recess therein and further comprising a weight configured in size and shape to fit within the recess for selectively weighting the rod mount.

4. The apparatus of claim 1, wherein the first latch portion of the latch comprises an upwardly extending protrusion for selectively engaging the rod mount when in the first position to secure the rod mount to the reel mount.

5. The apparatus of claim 1, wherein the second latch portion of the latch comprises a downwardly extending protrusion for selectively engaging the support arm to secure the reel mount to the support arm.

6. The apparatus of claim 4, wherein the lever of the latch comprises at least one laterally extending arm to allow a user to pivot the latch from the first position to the second position in which the upwardly extending protrusion is disengaged from the rod mount to allow the rod mount to be removed from the reel mount.

7. The apparatus of claim 1, wherein the reel mount defines a longitudinally extending recess configured for receiving at least a portion of the latch therein and wherein the latch is pivotally coupled to the reel mount.

8. The apparatus of claim 7, further comprising an aperture in communication with the longitudinally extending recess for receiving the retaining portion of the support arm therein, the latch positioned above the retaining portion of the support arm.

9. The apparatus of claim 5, wherein the retaining portion of the support arm defines a transversely extending notch for engaging the downwardly extending protrusion of the latch.

10. The apparatus of claim 1, wherein the latch is biased relative to the reel mount to force the proximal end of the latch toward the rod mount.

11. The apparatus of claim 1, further comprising a harness configured for being attached to a user and wherein the proximal end of the support arm is coupled to the harness.

12. The apparatus of claim 11, wherein the harness further comprises a chest plate and a plurality of straps for securing the chest plate to a torso of a user.

13. The apparatus of claim 12, wherein the support arm is pivotally coupled to the chest plate to allow the support arm to be secured at one of a plurality of angles relative to the chest plate.

14. The apparatus of claim 1, wherein said reel mount comprises an end cap defining an arcuate recess in one side thereof for receiving one end of a reel foot, the end cap configured for being attached to a distal end of the reel mount.

15. The apparatus of claim 6, wherein the reel mount defines a transversely extending recess, the at least one laterally extending arm positioned therein.

16. The apparatus of claim 11, wherein the harness is configured to support the rod mount and reel mount when the support arm is coupled between the reel mount and the rod mount.

17. An apparatus for coupling a fishing rod to a reel, comprising:
   a rod mount having a reel foot on a top portion thereof configured for attachment to a reel seat of a fishing pole;
   a reel mount slidably attached to the reel mount and having a rod seat on a bottom portion thereof configured for attachment to a reel foot of a fishing reel;
   a latch pivotally coupled between the rod mount and the reel mount comprising:
      a lever;
      a first latch portion on a first end of the latch securing the reel mount to the rod mount when the latch is in a first position and releasing the reel mount from the rod mount when the latch is pivoted to a second position by the lever allowing the rod mount to be slid from the reel mount, the latch member being biased toward the first position; and
      a second latch portion opposite the first latch portion; and
   a support arm having a proximal end portion configured for being secured to a user and having a distal end portion engaging the second latch portion of the latch when the latch is in the first position, whereby pivoting the latch from the first position releases the second latch portion from the support arm allowing the support arm to be released from the reel mount.

18. The apparatus of claim 17, wherein the first latch portion of the latch comprises an upwardly extending protrusion for engaging a catch on the rod mount when in the first position to secure the rod mount to the reel mount.

19. The apparatus of claim 17, wherein the second latch portion of the latch comprises a downwardly extending protrusion for selectively engaging a notch in the support arm to secure the reel mount to the support arm.

20. The apparatus of claim 17, wherein the reel mount defines a longitudinally extending recess configured for receiving at least a portion of the latch therein, the latch being pivotally coupled to the reel mount.

* * * * *